July 10, 1928.

A. A. TEISHER

BELT AND METHOD OF MAKING THE SAME

Filed March 21, 1925

1,676,845

INVENTOR
Austin A. Teisher,
BY
ATTORNEY

Patented July 10, 1928.

1,676,845

UNITED STATES PATENT OFFICE.

AUSTIN A. TEISHER, OF AKRON, OHIO, ASSIGNOR TO THE GOODYEAR TIRE & RUBBER COMPANY, OF AKRON, OHIO, A CORPORATION OF OHIO.

BELT AND METHOD OF MAKING THE SAME.

Application filed March 21, 1925. Serial No. 17,314.

My invention relates to belts and a method of constructing them which shall insure the production of such articles having certain desirable operating characteristics.

My invention has for one of its objects, to dispose in belting, reinforcing cords which will improve the operating characteristics of the belt.

More particularly it is an object of my invention to provide a belt which will ride on the center of a pulley over which it passes, rather than have a tendency to run to one side. The advantages of my invention are realized by a novel process of manufacturing the belt, which facilitates securing the desirable properties in the finished product.

Fabric belting has long been used in the art for duties for which other belting is unsuitable. Various materials are used in these belts. For example, canvas, duck and rubberized fabric are typical materials used to form the external ply or layer of the belt, while rubberized fabric or composition has been employed often to form the core of the belt. Belts of such character are sometimes reinforced with cords of various materials running through the belt, in order to increase the tensile strength and resistance to permanent elongation. One objection which has been found with these belts is that they have a tendency to ride to one side of the pulley. This does not result in satisfactory operation; belt guides are necessary and the belt chafes and wears along its edges.

It has been proposed to make belts by winding a cord under tension on a layer of rubberized fabric and vulcanizing while the entire belt is under tension. After vulcanization, the belt is removed substantially as a finished product. A belt so manufactured is open to criticism because it has a relatively limited amount of elasticity. A belt made according to my invention will have its modulus of elasticity increased to a sufficient extent to impart a desirable degree of flexibility and life to the belt.

It has been found that the tendency of a belt, made according to present practice, to run to one side of the pulley, is due to the fact that the cords are twisted all in the same direction. It has been discovered that in the construction of a belt, by using cords, some of which are twisted to the left and others to the right, the belt will run directly on the center of the pulley rather than to one side. The assumption, for purposes of explanation, is that this new result is accomplishd by balancing the internal forces in the belt.

If a cord be held in vertical position, it will be seen that the strands of the cord are spiraled in one direction. If this spiral appears to run up the cord to the right, the cord is said to have a right-hand twist, and if the spiral appears to run up the cord to the left, it is said to have a left-hand twist. The twist of these cords viewed in section may be indicated by a counter-clockwise arrow for a right-hand twist and by a clockwise arrow for a left-hand twist.

In the manufacture of cord belts practiced heretofore, it has been customary to use cords twisted in one direction only. When a belt of this construction is placed around a pulley, there is a decided tendency for the belt to run to the side. The edge of the belt will be worn away long before the belt face is worn out, because of a chafing action that usually results.

Under sudden applications of load, a dead belt, that is, one which is made and vulcanized under tension, will be likely to break, whereas, if the belt were somewhat more elastic, it could respond to the sudden applications of load and elongate sufficiently to absorb the shock without breaking.

These difficulties may be obviated by employing cords, some of which twist to the right and some of which twist to the left. The precise manner in which these cords are applied is not controlling, because the balancing action may be attained in a multiple twist cord belt in several ways. The increased modulus of elasticity of the belt may be obtained by relieving some of the tension in the belt while it is being vulcanized.

In the drawings, wherein is shown a specific means for practicing my invention:

Figure 1:
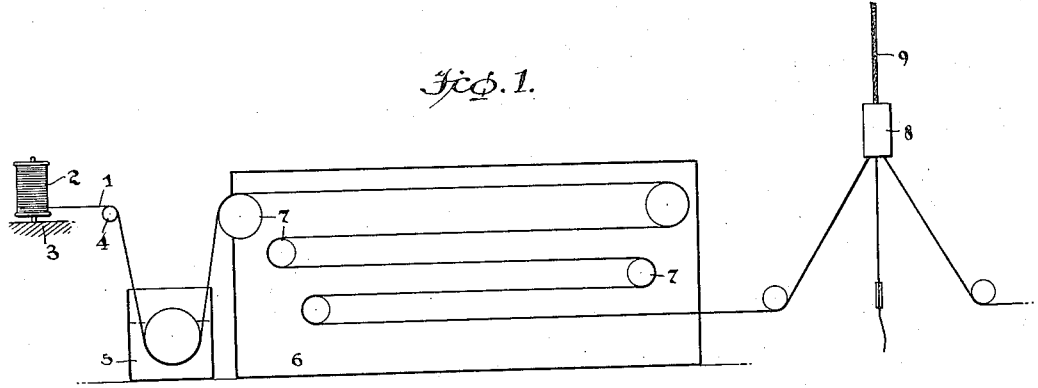
Fig. 1 is a diagrammatic view illustrating the initial steps of my process.

Referring more specifically to the drawings, particularly to Fig. 1; a strand 1 is shown mounted on a spool 2, which is supported on a table 3. The strand 1 is led over suitable pulleys 4 into a bath 5 of rubber agglutinant. The strand, impregnated with rubber solution, is then led through a drying oven 6 by means of suitable pulleys 7. The strand is then fed into a winding machine 8 where a suitable number are twisted to form a cord 9. As shown in this view, the cord 9 has a right-hand twist. In order to form a left-hand twist on the same machine, it is merely necessary to reverse the driving motor.

Figure 2:
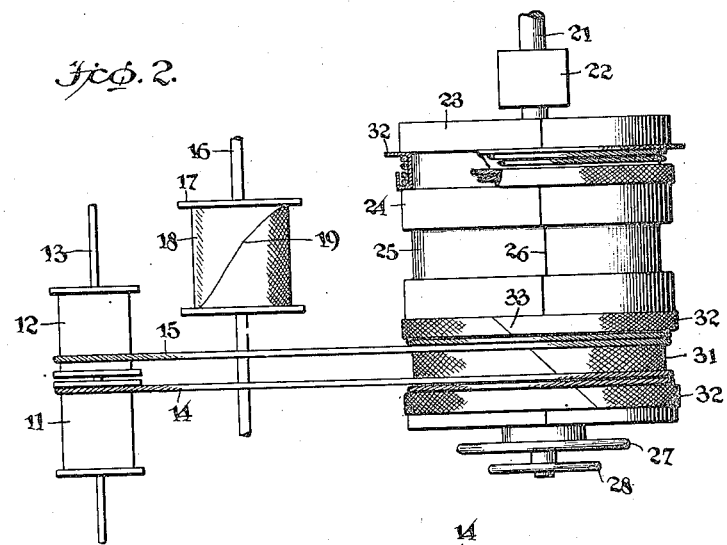
Fig. 2 is a schematic plan view of apparatus that may be utilized in practicing my method of forming a belt.

Two spools of cord 11 and 12 are then mounted on a suitable spindle 13, as shown in Fig. 2. The spool 11 carries a left-hand twisted cord 14 and the spool 12 has a right-hand twisted cord 15 wound thereon. On another spindle 16, a spool 17 of rubberized fabric 18 is mounted. The rubberized fabric may be made by running suitable cloth, such as duck, through a bath of rubber agglutinant in a manner similar to that employed for coating the strands 1.

A shaft 21, mounted in a bearing 22 and driven by a suitable source of power, not shown, has a collapsible chuck or mandrel 23 mounted on its outer end. The mandrel is made with a series of shoulders 24 and grooves 25 in order to make several belts at the same time on the same mandrel. A joint 26, is shown in the face of the mandrel, indicating to those skilled in the art the manner in which it may be made. Hand wheels 27 and 28 are provided on the outer end of the mandrel to raise or lower the sections and to lock them in position.

In making my belt, the mandrel is expanded to full size and covered with a requisite number of strips of rubberized fabric 18, which is cut on a bias, as indicated at 19. The strips fit into the grooves and over the shoulders of the mandrel, forming sections 31 and 32. The coinciding ends of the strip are secured together by pasting over them a strip of rubber tape 33. The cords 14 and 15 may then be wound on the rubberized fabric 18. In winding these strips, the cord may be started at the outer edge on either side of the groove 31 and wound in helical formation to substantially the center of the strip. The cords may be wound first one and then the other, or they may both be wound simultaneously, or the spools 11 and 12 may be disposed so as to wind the cords 14 and 15 in alternate relation. If desired, both cords may be wound from either their right or left hand limits and several layers of cord may be applied. It is also possible to attain desirable results by winding on a single cord, which is twisted partly to the right and partly to the left.

When a proper amount of cord has been spiraled onto the rubberized fabric, the ends thereof are impressed into the fabric. Because it is desired to obtain a certain degree of elasticity in the belt, it is preferable not to tie the ends of the cords. They will remain in position, being held by the natural adhesion of the rubber agglutinant with which they are coated.

The next step of the operation consists in turning over the edges 32 of the fabric to enclose the cords. This is done by means of any suitable tool while the mandrel is rotating. A strip of rubber is then passed over the adjoining edges as shown at 34. The mandrel is then collapsed by operation of the wheels 27 and 28 and the belt removed. After this, the belt is placed over a core of a diameter somewhat less than that of the mandrel and vulcanized in any known manner, as by applying heat.

It is apparent that the belt will contract a slight amount when the tension caused by the expanded mandrel is removed. Because of the smaller size of the core on which the belt is placed it will contract sufficiently to retain the natural or normal resiliency and elasticity of the materials embodied in its construction.

Figure 3:
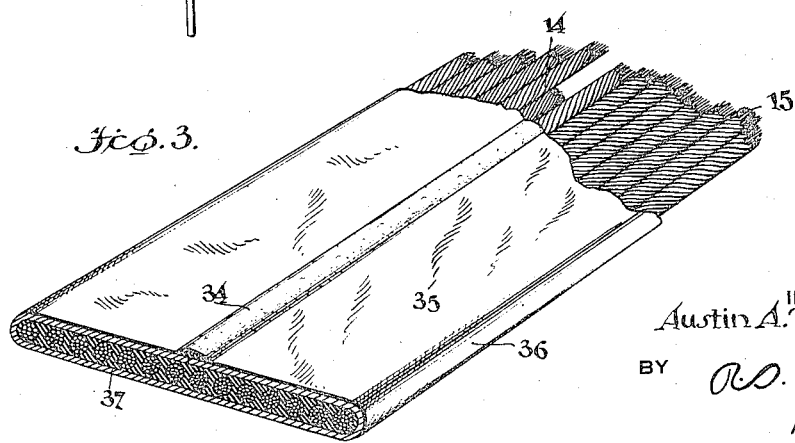
Fig. 3 is a perspective view, partly broken away, of a finished belt.

Fig. 3 shows the finished product. The belt 35 has now an outer ply 36 of rubberized fabric. A core 37 of rubber composition has formed between the cords, during the vulcanization process. In this core, the cords 14 and 15 are firmly embedded in their normal, that is, uncompressed and unstretched condition. The resulting product possesses a higher degree of resiliency and elasticity than it has been possible to attain heretofore by building the belts under tension. By employing cords of right and left hand twists, I am able to so neutralize the internal stresses in the belt that it will ride directly on the center of the pulley over which it is placed.

The precise number of cords which are employed is not controlling, the number shown being for purposes of illustration only. Although the drawing shows an outer ply 36 and a core 37, this is to be taken as illustrative of fabricated belting in general, and it is to be understood that the invention is not necessarily limited to building belts with multiple twisted cords in such structure. It is also apparent that in building a belt without cords and by employing a collapsible mandrel, a belt is obtained which has a higher degree of resiliency and elasticity than attainable heretofore.

Belting made according to this invention is applicable wherever fabricated belting may be used. Engine fan belts, transmission belts on harvesters, textile mills, conveyor belts, etc., may be cited as some of the applications.

Although I have described this invention specifically in connection with belting, it is to be understood that it is not so limited but that the principles of the invention are capable of use in other structures. I intend, therefore, that my invention shall be limited only as indicated by the scope of the following claims.

What I claim is:

1. A belt comprising a core of vulcanized rubber having right and left hand twisted cords embedded therein in their normal condition and enclosed in an envelope of rubberized fabric.

2. A belt comprising a plurality of rubberized cords disposed in substantially parallel relation and enclosed in an envelope of rubberized fabric in their normal uncompressed and unstretched condition, some of the cords being formed with a right hand twist and some of the cords being formed with a left hand twist.

3. A belt comprising a plurality of rubberized cords embedded in their normal uncompressed and unstretched condition, in a core of vulcanized rubber enclosed within an envelope of rubberized fabric, the cords adjacent the center line of the belt being formed respectively with right and left hand twists.

4. A belt comprising an envelope of fabric surrounding a core of vulcanizable material having embedded therein in their normal condition re-inforcing elements composed of cords, substantially half of which are formed with a right hand twist, and the remainder of which are formed with a left hand twist.

5. A method of making belts which comprises wrapping a strip of rubberized fabric on a collapsible mandrel, covering the strip with uncompressed rubberized cords of different twist, removing the assembly from the mandrel and vulcanizing the assembly.

6. A method of making cord belts which comprises twisting a plurality of cords in opposite directions, winding them on a strip of vulcanizable fabric mounted on a collapsible mandrel, removing the strip and vulcanizing the same under substantially no tension.

7. A method of making a belt which comprises wrapping a strip of rubberized fabric on a collapsible mandrel to form the belt, removing the belt from the mandrel and vulcanizing it under substantially no tension whereby the modulus of elasticity of the belt is made relatively high in value.

8. A method of making belts which comprises applying a plurality of right and left hand twisted rubberized cords to a band of rubberized fabric supported in distended position, enclosing the cords within the fabric, removing the band from its support to relieve the tension, and vulcanizing under no tension.

In witness whereof, I have hereunto signed my name.

AUSTIN A. TEISHER.